United States Patent
Shen et al.

(10) Patent No.: US 10,674,018 B2
(45) Date of Patent: Jun. 2, 2020

(54) SCENE-BASED VIBRATION FEEDBACK METHOD AND MOBILE TERMINAL

(71) Applicant: AAC Technologies Pte. Ltd., Singapore (SG)

(72) Inventors: Hanliang Shen, Shenzhen (CN); Xiuyue Wang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/527,025

(22) Filed: Jul. 31, 2019

(65) Prior Publication Data
US 2020/0045184 A1    Feb. 6, 2020

(30) Foreign Application Priority Data
Aug. 4, 2018    (CN) .......................... 2018 1 0880981

(51) Int. Cl.
| | |
|---|---|
| *G06F 9/445* | (2018.01) |
| *G06F 3/01* | (2006.01) |
| *G06F 3/0488* | (2013.01) |
| *G06F 3/0481* | (2013.01) |
| *H04W 4/20* | (2018.01) |
| *H04M 19/04* | (2006.01) |

(52) U.S. Cl.
CPC ............ *H04M 19/047* (2013.01); *H04W 4/20* (2013.01)

(58) Field of Classification Search
CPC ............................. H04M 19/047; H04W 4/20
USPC ........................................................ 455/567
See application file for complete search history.

(56) References Cited

U.S. PATENT DOCUMENTS

| | | | |
|---|---|---|---|
| 2015/0199385 A1* | 7/2015 | Choi ...................... | G06F 16/58 382/305 |
| 2016/0018654 A1* | 1/2016 | Haddick ............ | G02B 27/0172 345/8 |
| 2016/0277863 A1* | 9/2016 | Cahill .................... | H04R 3/005 |
| 2017/0110990 A1* | 4/2017 | Hu ........................ | H02P 25/032 |
| 2018/0005441 A1* | 1/2018 | Anderson ............. | A63F 13/655 |
| 2019/0320231 A1* | 10/2019 | Nasir .................. | H04N 21/4788 |

* cited by examiner

*Primary Examiner* — Inder P Mehra
(74) *Attorney, Agent, or Firm* — W&G Law Group LLP

(57) ABSTRACT

Provided is a scene-based vibration feedback method, including: step A of presetting scenes in an application as specific scenes; step B of presetting vibration senses corresponding to the specific scenes; and step C of monitoring a scene currently occurring in the application in real time while the application is running, and providing a corresponding vibration sense when the monitored scene is one of the specific scenes. The step B further comprises: presetting vibration sense information corresponding to the vibration senses; and presetting a correspondence between the specific scenes and the vibration sense information. The step C further comprises: acquiring, when the monitored scene is one of the specific scenes, vibration sense information corresponding to the one specific scene according to the correspondence; and driving a motor built in a terminal to vibrate in accordance with the vibration sense information acquired in the step C1.

8 Claims, 2 Drawing Sheets

SCENE-BASED VIBRATION FEEDBACK METHOD AND MOBILE TERMINAL

TECHNICAL FIELD

The present disclosure relates to the field of smart devices, and in particular, to a scene-based vibration feedback method and a mobile terminal.

BACKGROUND

With the continuous advancement of science and technology, electronic devices have more and more integrated functions, and the application of mobile phones, tablet computers and other terminal products has become more and more extensive. At present, people may meet their own needs by installing a variety of applications on the terminal. For example, people may install news applications on the terminal to learn about current events. Video and music applications may be installed on the terminal to watch or play videos. Game applications may be installed on the terminal for entertainment, intelligence training, killing time, etc.

However, the inventors of the present disclosure have found that a motor is usually provided in a terminal in the related art, and when there is an incoming call or a short message in the terminal, the motor in the terminal vibrates to prompt the user, or when the user controls the terminal to run certain applications, if the user clicks on some of the operation controls in the application, the motor in the terminal will also vibrate to prompt the user. It may be seen that in the related art, the vibration triggering mode of the terminal's motor is mostly triggered by information (mail or short message) or by a button (physical button or virtual button), and the triggering mode is relatively single, which limits the further improvement of the human-computer interaction experience between the user and the terminal.

BRIEF DESCRIPTION OF THE DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be further illustrated with reference to the accompanying drawings and the embodiments.

Figure 1:
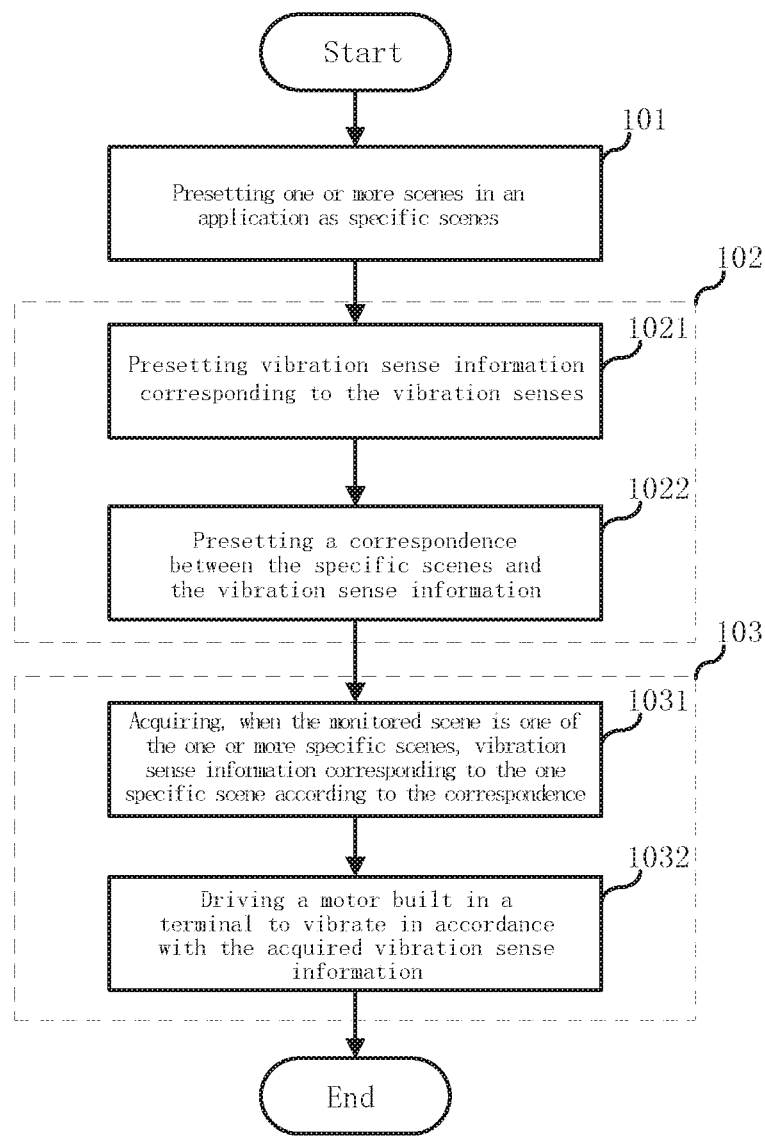
FIG. 1 is a flowchart of a scene-based vibration feedback method according to a first embodiment of the present disclosure.

A first embodiment of the present disclosure relates to a scene-based vibration feedback method, and the specific flow is shown in FIG. 1. The vibration feedback method according to the present embodiment is implemented in an application of a terminal. The terminal may be a portable electronic device such as a mobile phone or a tablet computer. The following is a detailed description of the scene-based vibration feedback method in the present embodiment. The steps are as follows.

In step 101, one or more scenes in an application are preset as specific scenes.

Specifically, a user or technician may pre-select one or more scenes as specific scenes in an application. For example, when the application is a game application, the user or technician may select a confrontation scene in the game application as a specific scene.

More specifically, when the user presets one or more scenes in the application as specific scenes, the application may be set with a setting trigger mode of the specific scene (e.g., button trigger, combination button trigger, etc.), so that the user may set the specific scene in a timely manner when the application runs and the scene that occurs is the specific scene that he/she wants to set, which is not only easy to operate, but also has a higher matching degree between the specific scene and the user requirement. That is to say, the application may have a custom function, so that the user may set a specific scene by himself with this custom function. When the technician presets one or more scenes in the application as specific scenes, the technician may pre-collect and save the related information of the specific scene in a preset server, so that the application achieves the presetting of a specific scene by accessing the preset server to acquire the related information of the specific scene. For example, when the application is a game application and a confrontation scene is selected as a specific scene, the technician may input and save the related information of the confrontation scene (e.g., layer, rendered object, specified action of the rendered object, positional relationship of each rendered object, etc.) in the preset server. That is to say, the application may preset the specific scene by itself to reduce the user's participation in the setting operation, and the application is more intelligent. In practice, the application may have both a custom function and the ability to set specific scenes by itself to make the application more widely available.

In step 102, vibration senses corresponding to the specific scenes are preset.

Specifically, the user or technician sets a vibrate sense for each specific scene of the application. Step 102 in this embodiment includes sub-step 1021 and sub-step 1022, which will be specifically described below.

In sub-step 1021, vibration sense information corresponding to the vibration senses is preset.

Specifically, the user or the technician may preset a plurality of motor driving signals for driving the motor to vibrate. Each of the motor driving signals drives the motor to vibrate and generate one of the vibration senses, and each of the motor driving signals corresponds to the vibration sense information of one of the vibration senses. In this way, different specific scenes may correspond to different vibration senses, so that the user may learn more effective information according to the vibration sense, further improving the human-computer interaction experience between the user and the terminal.

In sub-step 1022, a correspondence between the specific scene and the vibration sense information is preset.

Specifically, the user or the technician sets vibration sense information for each specific scene of the application to implement the setting of the correspondence between the specific scene and the vibration sense information in the application.

In step 103, a scene currently occurring in the application is monitored in real time while the application is running, and when the monitored scene is a specific scene, a corresponding vibration sense is provided.

Specifically, when the user selects an application icon corresponding to the application in the terminal, the terminal runs the application. Step 103 in this embodiment includes sub-step 1031 and sub-step 1032, which will be described below.

In sub-step 1031, when the monitored scene is a specific scene, vibration sense information corresponding to the specific scene is acquired according to the correspondence.

Specifically, the application monitors a currently occurring scene in real time and determines whether the currently occurring scene is a specific scene. The manner in which the application monitors the currently occurring scene may be: the application monitors and acquires a currently displayed scene element, such as a layer, a rendered object, an action specified by the rendered object, a positional relationship of each rendered object, etc., and determines the currently occurring scene according to the acquired scene element. The scene element such as the layer, the rendered object, the action specified by the rendered object, and the positional relationship of each rendered object is only used as an example. The present embodiment does not limit the specific implementation of the scene element.

More specifically, the application is a game application, and the specific scene is an interaction of the game elements. When the application executes step 1031, the game application may perform collision detection, and acquire the positional relationship of each rendered object according to a result of the collision detection, and determine whether the game elements interact to determine whether the current scene is a specific scene. For example, if the result of the collision detection of the game application is that a collision occurs, the game application determines that the game elements interact, and the determination result of step 1031 is YES. In this way, it provides a basis for intuitively warning and prompting the player, so as to avoid, as much as possible, the situation where the player ignores the important information in the high confrontation, and may further mobilize the player's game participation and enhance the game experience.

In sub-step 1032, based on the acquired vibration sense information, a motor built in a terminal is driven to vibrate.

Specifically, the application retrieves a corresponding motor driving signal based on the acquired vibration sense information, so as to drive the motor built in the terminal to vibrate according to the acquired motor driving signal. The motor driving signal may exist in the form of waveform data, and the vibration sense information may be an index number of the motor driving signal. In this way, when the application drives the motor built in the terminal to vibrate based on the acquired vibration sense information, the program command may be shortened, reducing the processing pressure of the terminal. For example, the application may acquire a vibration frequency and a vibration amplitude according to the waveform data of the motor driving signal, thereby controlling the motor to vibrate according to the acquired vibration frequency and vibration amplitude.

More specifically, the number of motors of the terminal may be one or more, and the object of implementing scene-based vibration feedback may be achieved in an either way. In the present embodiment, the number of motors built in the terminal is N, and N is a natural number greater than 1. The vibration sense includes vibration senses of respective ones of the N motors corresponding to the specific scene, and the correspondence between the specific scene and the vibration sense information may be a correspondence between the specific scene and the vibration sense information of each of the N motors. In this way, when the terminal acquires the vibration sense information corresponding to the monitored scene according to the correspondence, the terminal may drive the N motors to vibrate according to the vibration senses of respective ones of the N motors corresponding to the specific scene. In this way, the independent or cooperative operation of multiple motors may provide more forms of vibration senses, enabling the user to learn more effective information according to the vibration sense, and further improving the human-computer interaction experience between the user and the terminal.

In this embodiment, step 101 and step 102 are used as initial settings of information. Usually, one setting may be performed without requiring the user to preset information every time the application is turned on, which may simplify the manual operation of the user and enable the user to enjoy a good experience.

Compared to the related art, in this embodiment, one or more scenes of an application are pre-set as specific scenes in a terminal, and vibration senses corresponding to the specific scenes are pre-set in the terminal, so that a correspondence between the specific scene of the application and the vibration sense information may be pre-set in the terminal. In this way, when the terminal runs the above application, when a currently occurring scene of the application is a specific scene, the terminal may acquire the vibration sense information corresponding to the specific scene according to the preset correspondence between the specific scene and the vibration sense information, so as to drive the motor of the terminal to vibrate according to the acquired vibration sense information, and provide a corresponding vibration sense. In this way, the motor in the terminal may be triggered according to the current scene of the application, effectively improving the human-computer interaction experience between the user and the terminal.

A second embodiment of the present disclosure relates to a scene-based vibration feedback method. The second embodiment is refined on the basis of the first embodiment. The main improvement is that, in the second embodiment of the present disclosure, a specific implementation is provided in which a motor in a terminal is triggered to vibrate according to a current scene of an application. The scene-based vibration feedback method in the present embodiment will be described in the following.

In this embodiment, the terminal is a terminal having an Android system. When the application executes step 103, the application monitors a scene currently occurring in the application in an application layer in real time. When the monitored scene is a specific scene, an index number corresponding to the specific scene is acquired according to the correspondence. Then, the application sends the acquired index number to a JNI layer by means of interface call in the application layer, retrieves a motor driving signal according to the index number in the JNI layer, and transmits the motor driving signal retrieved in the JNI layer to a driving layer, and then a driving chip in the driving layer inputs the motor driving signal to a motor in a physical layer. For example, the application layer calls a Haptic SDK (Software Development Kit, "SDK") interface to output a program instruction Play Vibrate (int index) to the JNI layer. The index represents the index number. The JNI layer acquires the motor driving signal corresponding to the index number from the correspondence according to the program instruction Play Vibrate (int index), and transmits the motor driving signal to the driving layer, so that the driving chip in the driving layer acquires a corresponding electrical signal according to the motor driving signal and inputs the electrical signal to the motor to achieve vibration of the motor. The driving chip may amplify the electrical signal before inputting the electrical signal to the motor.

It should be noted that the Android system may have both an application running in the foreground and an application running in the background. In this embodiment, when the application is running in the foreground, the application executes the scene-based vibration feedback method involved in the present embodiment to avoid providing unnecessary vibration senses to the user. However, in this embodiment, the moment when the application is preset to monitor the scene currently occurring in the application in real time is not limited. In practice, the user may preset monitoring the scene currently occurring in the application in real time when the application runs in the foreground or in the background according to actual needs of the user.

Figure 2:
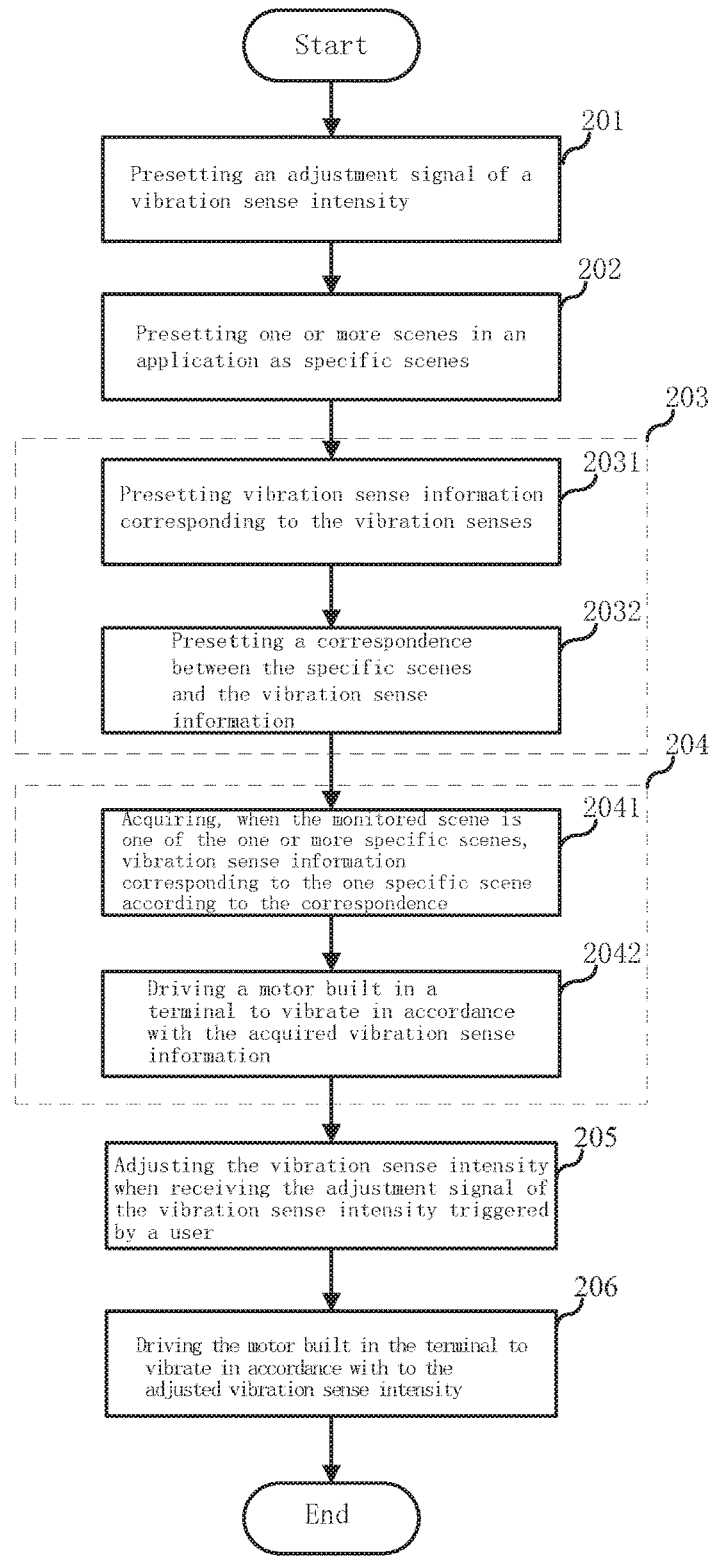
FIG. 2 is a flowchart of a scene-based vibration feedback method according to a third embodiment of the present disclosure.

A third embodiment of the present disclosure relates to a scene-based vibration feedback method, and the specific flow is as shown in FIG. 2. The third embodiment is improved on the basis of the first embodiment or the second embodiment. The main improvement is that in the third embodiment of the present disclosure, the user may control the terminal to adjust a vibration sense intensity in such a manner that the vibration sense currently provided by the terminal may match the individual needs of the user. The scene-based vibration feedback method in the present embodiment will be specifically described below:

Steps 202 to 204 in this embodiment are substantially the same as steps 101 to 103 in the first embodiment, sub-step 2031 to sub-step 2032 are substantially the same as sub-step 1021 to sub-step 1022, and sub-step 2041 to sub-step 2042 are substantially the same as the sub-step 1031 to the sub-step 1032. To reduce the repetition, it will not be described here, only the different parts will be described below.

In step 205, a vibration sense intensity is adjusted when a vibration sense trigger signal triggered by the user is received.

Specifically, the technician pre-sets an adjustment signal of a vibration sense intensity in the application so that the user may trigger the adjustment signal to adjust the vibration sense intensity. The vibration sense trigger signal may exist in the form of a button or a combination button or a gesture. The vibration sense intensity may include vibration amplitude, vibration frequency, or a combination of vibration amplitude and vibration frequency.

More specifically, the application may provide a prompt interface when being started. The prompt interface includes a vibration feedback function option for the user to turn the vibration feedback function on or off. If the application detects that the user has turned on the vibration feedback function, it means that the user may adjust the vibration sense intensity by triggering the vibration sense adjustment signal. In this way, the user may conveniently and quickly set the turn-on/off of the vibration sense function according to the current actual application requirements, thereby not only eliminating the cumbersome setting operation, but also making the service provided by the application match the user's use requirement, providing good user experience. For example, the prompt interface may include a virtual button "Yes" and a virtual button "No". If the user clicks the virtual button "Yes", the application determines that the user has turned on the vibration feedback function. Alternatively, the prompt interface may include text prompt information. For example, if the text prompt information is "double-clicking the screen, the vibration feedback function is turned on", the application may determine that the user has turned on the vibration feedback when detecting that the user double-clicks the screen. However, the above-mentioned example of the prompt interface is only exemplified, and the specific implementation of the prompt interface is not limited in this embodiment.

In step 206, the motor built in the terminal is driven to vibrate according to the adjusted vibration sense intensity.

Specifically, the technician may store the correspondence between the vibration sense trigger signal and the vibration sense intensity in the application in advance, so that the application acquires the corresponding vibration sense intensity according to the acquired vibration sense trigger signal, and drives the motor built in the terminal to vibrate according to the adjusted vibration sense intensity. Alternatively, the application may also pre-store the adjustment information of the vibration sense intensity, so that the application may adjust the vibration sense intensity according to the preset vibration sense intensity adjustment information every time the application detects the vibration sense trigger signal.

It should be noted that the application may also generate feedback information according to the vibration sense trigger signal triggered by the user, so as to update the correspondence between the specific scene and the vibration sense information according to the feedback information. For example, the application may generate feedback information including an adjustment amount of the vibration amplitude, an adjustment amount of the vibration frequency, or an adjustment amount of the vibration amplitude and the vibration frequency according to the triggered vibration sense trigger signal.

Compared with the above embodiment, the beneficial effect of the present embodiment is that the user may adjust the working form of the motor by itself, so that the vibration sense currently provided by the terminal may match the personal needs of the user. Moreover, the terminal further updates the correspondence according to the feedback information input by the user, so that when the terminal controls the motor to vibrate next time, the terminal may provide a vibration sense highly matching with the user's personal usage habits, and the degree of intelligence is higher, thereby further improving the human-computer interaction experience between the user and the terminal.

Figure 3:
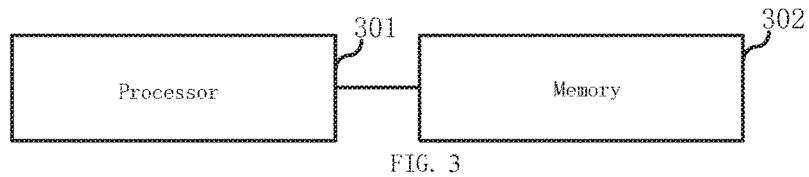
FIG. 3 is a schematic structural diagram of a mobile terminal according to a fifth embodiment of the present disclosure.

A fourth embodiment of the present disclosure relates to a mobile terminal, as shown in FIG. 3, including at least one processor 301 and a memory 302 communicably coupled to the at least one processor 301. The memory 302 stores instructions executable by the at least one processor 301. The instructions are executed by the at least one processor 301 to enable the at least one processor 301 to perform the scene-based vibration feedback method of the above-described embodiments.

The memory 302 and the processor 301 are connected in a bus manner. The bus may include any number of interconnected buses and bridges. The bus connects the various circuits of the one or more processors 301 and the memory 302. The bus may also connect various other circuits, such as peripherals, voltage regulators and power management circuits, as is well known in the art, and therefore, this will not be further described herein. A bus interface provides an interface between the bus and a transceiver. The transceiver may be an element or a plurality of elements, such as multiple receivers and transmitters, providing units for communicating with various other devices on a transmission medium. The data processed by the processor 301 is transmitted over the wireless medium via an antenna. Further, the antenna also receives the data and transmits the data to the processor 301.

The processor 301 is responsible for managing the bus and normal processing, and may also provide various functions including timing, peripheral interfaces, voltage regulation, power management, and other control functions. The memory 302 may be used to store data used by the processor 301 in performing operations.

Compared with the related art, the motor in the terminal may be triggered according to the current scene of the application, which is beneficial to improving the human-computer interaction experience between the user and the terminal.

A fifth embodiment of the present disclosure relates to a computer readable storage medium storing a computer program. The above method implementation is implemented when the computer program is executed by the processor.

Compared with the related art, in the embodiment of the present disclosure, the motor in the terminal may be triggered according to the current scene of the application, which is beneficial to improving the human-computer interaction experience between the user and the terminal.

A person skilled in the art may understand that the above embodiments are specific embodiments for implementing the present disclosure, and various formal or detail changes may be made without departing from the spirit and scope of the present disclosure.

The invention claimed is:

1. A scene-based vibration feedback method, comprising the following operations performed by at least one processor:
presetting one or more scenes in an application as one or more specific scenes;
presetting vibration senses corresponding to the one or more specific scenes; and
monitoring a scene currently occurring in the application in real time while the application is running, and providing a corresponding vibration sense when the monitored scene is one of the one or more specific scenes;
wherein the operation of presetting vibration senses corresponding to the one or more specific scenes further comprises:
presetting vibration sense information corresponding to the vibration senses and presetting a plurality of motor driving signals corresponding to the vibration sense information, the plurality of motor driving signals is for driving a motor built in a terminal to vibrate and generate one of the vibration senses; and
presetting a correspondence between the one or more specific scenes and the vibration sense information; and
the operation of monitoring a scene currently occurring in the application in real time while the application is running, and providing a corresponding vibration sense when the monitored scene is one of the one or more specific scenes further comprises:
acquiring, when the monitored scene is one of the one or more specific scenes, vibration sense information corresponding to the one specific scene according to the correspondence; and
retrieving the corresponding motor driving signal in accordance with the vibration sense information acquired, and driving the motor built in the terminal to vibrate in accordance with the motor driving signal retrieved;
the vibration sense information is an index number of the motor driving signal.

2. The scene-based vibration feedback method as claimed in claim 1,
wherein the terminal is a terminal having an Android system; and
the step C comprises:
monitoring the scene currently occurring in the application at an application layer in real time;
acquiring, when the monitored scene is one of the one or more specific scenes, the index number corresponding to the one specific scene according to the correspondence;
sending the acquired index number to a JNI layer by means of interface call in the application layer, and retrieving the motor driving signal in the JNI layer according to the index number; and
transmitting the motor driving signal retrieved in the JNI layer to a driving layer so that a driving chip in the driving layer inputs the motor driving signal to the motor in a physical layer.

3. The scene-based vibration feedback method as claimed in claim 1, wherein there are N motors built in the terminal, where N is a natural number greater than 1;
the vibration sense comprises vibration senses of respective ones of the N motors corresponding to the one or more specific scenes; and
the correspondence comprises a correspondence between the one or more specific scenes and respective vibration sense information of the N motors;
said acquiring the vibration sense information corresponding to the one specific scene according to the correspondence comprises:
acquiring, according to the correspondence, respective vibration sense information of the N motors corresponding to the one specific scene; and
said driving the motor built in the terminal to vibrate in accordance with the vibration sense information specifically comprises:
driving the N motors respectively to vibrate in accordance with the acquired respective vibration sense information of the N motors corresponding to the one specific scene.

4. The scene-based vibration feedback method as claimed in claim 1, further comprising:
presetting an adjustment signal of a vibration sense intensity, the adjustment signal being capable of being triggered by a user to adjust the vibration sense intensity,
wherein the vibration sense intensity comprises a vibration amplitude and/or a vibration frequency.

5. The scene-based vibration feedback method as claimed in claim 1, wherein the application is a game application.

6. The scene-based vibration feedback method as claimed in claim 5, wherein the one or more specific scenes comprise a scene where game elements interact with each other.

7. A mobile terminal, comprising:
at least one processor; and
a memory communicatively coupled to the at least one processor,
wherein the memory stores instructions executable by the at least one processor, the instructions being executed by the at least one processor to enable the at least one processor to perform the scene-based vibration feedback method as claimed in claim 1.

8. A computer readable storage medium storing a computer program, wherein the computer program is executed by a processor to implement the scene-based vibration feedback method as claimed in claim 1.

\* \* \* \* \*